United States Patent
Woods et al.

(10) Patent No.: US 7,334,782 B2
(45) Date of Patent: Feb. 26, 2008

(54) CONTROLLED ATMOSPHERIC PRESSURE RESIN INFUSION PROCESS

(75) Inventors: Jack A Woods, Kent, WA (US); Andrew E. Modin, Enumclaw, WA (US); Robert D. Hawkins, Bonney Lake, WA (US); Dennis J. Hanks, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 696 days.

(21) Appl. No.: 10/485,725

(22) PCT Filed: May 28, 2003

(86) PCT No.: PCT/US03/16794

§ 371 (c)(1),
(2), (4) Date: Jan. 30, 2004

(87) PCT Pub. No.: WO03/101708

PCT Pub. Date: Dec. 11, 2003

(65) Prior Publication Data

US 2005/0073076 A1    Apr. 7, 2005

Related U.S. Application Data

(60) Provisional application No. 60/384,154, filed on May 29, 2002.

(51) Int. Cl.
*B29C 45/14* (2006.01)
(52) U.S. Cl. .................... 261/510; 264/571
(58) Field of Classification Search ............... 264/571, 264/510
See application file for complete search history.

(56) References Cited

U.S. PATENT DOCUMENTS

| | | | |
|---|---|---|---|
| 2,495,640 A | 1/1950 | Muskat | |
| 4,902,215 A | 2/1990 | Seemann, III | 425/406 |
| 5,441,692 A | 8/1995 | Taricco | 264/571 |
| 5,576,030 A | 11/1996 | Hooper | 425/112 |
| 6,843,953 B2 * | 1/2005 | Filsinger et al. | 264/510 |

* cited by examiner

*Primary Examiner*—Monica A Huson
(74) *Attorney, Agent, or Firm*—Perkins Coie LLP

(57) ABSTRACT

By evacuating the resin feed tank to a pressure below atmospheric pressure, employing cyclic compaction, and controlling the net compaction pressure, we are better able to control a resin infusion process, particularly a vacuum assisted resin transfer molding process, and produce aerospace-grade fiber-reinforced resin composite having fiber volume fractions and tool-side surface finishes comparable to or exceeding those made using an autoclave.

12 Claims, 5 Drawing Sheets

| RUN | PATTERN | PANEL # | STITCHING | RESIN PRESSURE | COMPACTION CYCLES | THICKNESS IN INCHES | CARBON FIBER VOLUME % | TOTAL FIBER VOLUME % |
|---|---|---|---|---|---|---|---|---|
| 5 | ++- | 2 | YES | ATM | NONE | 0.762 | 49% | 50% |
| 2 | +-- | 4 | YES | 20" Hg | NONE | 0.746 | 50% | 51% |
| 1 | +++ | 3 | YES | ATM | 7 | 0.730 | 51% | 52% |
| 7 | +-+ | 1 | YES | 20" Hg | 7 | 0.704 | 53% | 54% |
| 3 | -+- | U2 | NO | ATM | NONE | 0.679 | 55% | 55% |
| 8 | -++ | U3 | NO | ATM | 7 | 0.663 | 56% | 56% |
| 6 | --- | U4 | NO | 20" Hg | NONE | 0.651 | 57% | 57% |
| 4 | --+ | U1 | NO | 20" Hg | 7 | 0.633 | 59% | 59% |

CONTROLLED ATMOSPHERIC PRESSURE RESIN INFUSION PROCESS

CROSS-REFERENCE TO RELATED APPLICATIONS

This application claims the benefit of U.S. Provisional Patent Application 60/384,154, filed May 29, 2002.

TECHNICAL FIELD

The present invention relates to vacuum-only resin infusion for making fiber-reinforced resin composites, involving cyclic compaction of the preform and control of the net compaction pressure. The preferred process produces composites having high fiber volume fractions comparable to or exceeding those for conventional composites made in the autoclave. The composites can be used in aerospace applications when suitable fiber volume fractions are achieved.

BACKGROUND OF THE INVENTION

The marine, automotive, trucking, rail, aerospace, defense, recreation, chemical, infrastructure, and other industries look to composite materials to take advantage of their unique properties, especially being corrosion-free or corrosion-resistant and having a high strength-to-weight ratio. Composites are also resistant to fatigue and chemical attack. They offer high strength and stiffness potential in lightweight components. There is a need, however, to develop composite manufacturing processes that dramatically reduce the cost of composites, especially large structures, while retaining high strength and stiffness.

Open mold wet layup processing can make large composites using a liquid molding process with a small capital investment in single sided tooling, and often can use lower cost materials than resin-impregnated fibrous materials (prepregs). The quality and uniformity of the product, however, varies considerably. The best of these composites are still relatively low quality. The process also tends to be unfriendly and presents hazards to workers because of their risk of exposure to the solvents and resins.

High performance composites are currently made with prepreg. Woven or unidirectional tapes of the prepregs are placed on a forming mandrel ("laid up") by hand or machine. Debulking (compaction) is often required between plies in a laminate to remove air before the laminates are vacuum bagged (i.e., enclosed in an inert atmosphere under vacuum to withdraw emitted volatiles released during cure of the resin) and consolidated (i.e., exposed to elevated temperature and pressure in a curing cycle) in autoclaves or presses to achieve high fiber volume components. The prepreg materials typically are expensive (especially those using high modulus carbon fiber). The raw prepreg materials have limited shelf lives because the resins that impregnate the fibers continue to react ("advance") at ambient temperature. Advance of the resin adversely effects the properties of the resulting composite. Working with prepreg also often results in considerable material waste.

The autoclaves and presses used for consolidation to apply pressure to the laminated prepregs are expensive capital items that further increase the final, manufactured cost of the composite. Processing has to be centralized and performed in batches where the autoclave or press is installed. Loading and unloading the autoclave (a high temperature, pressurized oven) usually becomes the rate limiting step. The location of the autoclave dictates where the composites will be made, so the flexibility of the process is impaired. A dedicated workforce and facility are required, centered around the autoclave.

In some formulations, the resin in a prepreg is carried onto the fiber as a lacquer or varnish containing the monomer reactants that will produce the desired polymer in the composite (i.e., prepregs of the PMR-type). In other formulations, the resin is a relatively low molecular weight polymer that crosslinks during cure to form the desired polymer. The resin is held and used in its a state so that it remains a liquid, and can be impregnated onto the fiber or fabric. Reaction of the monomer reactants or crosslinking of the polymer (i.e., its advancing) prior to the intended cure cycle adversely impacts the quality of the composite.

Liquid molding techniques such as transfer molding, resin film infusion, resin transfer molding, and structural reaction injection molding (SRIM) typically require expensive matched metal dies and high tonnage presses or autoclaves. Parts produced with these processes are generally limited in size and geometry.

Infusion of dry preforms with wet resin with the use of vacuum (atmospheric pressure) as the only driving force is known. While there may be earlier examples, the Marco method (U.S. Pat. No. 2,495,640) was first used in the early 1940s. Palmer (U.S. Pat. No. 4,942,013) and Seemann (U.S. Pat. No. 4,902,215) are more recent examples. We are also aware of a number of other approaches covered in composite technology literature: RIRM, RIFT, and UV-VaRTM. Boeing's Double Bag Vacuum Infusion (DBVI) process, described in U.S. patent application Ser. No. 09/731,945, makes numerous claims regarding the control of the vacuum-assisted infusion with a resin distribution media, multiple porting, or channels. Seemann has been awarded other patents largely having to do with integration of a resin distribution matrix into a re-usable bag, such as U.S. Pat. Nos. 5,052,906; 5,316,462; 5,439,635; and 5,958,325.

The physics of the infusion process requires a pressure differential across the preform to drive the infusion of the resin into the preform. The traditional approaches infuse the resin at full atmospheric pressure, i.e., the reservoir from which the resin is being drawn is open to the atmosphere. During infusion as the preform fills with resin, the pressure inside the vacuum bag (i.e., the impervious outer sheet that contains the flow of resin during the infusion) in the filled volume approaches the pressure outside the bag, namely atmospheric pressure. Because vacuum-only resin infusion relies solely on the overpressure of the atmosphere to constrain the preform beneath the bag against the forming surface, this rise in pressure inside the bag reacts against the atmospheric pressure above. The remaining difference in pressure between that inside the bag and atmospheric pressure (i.e., the net compaction pressure) is all the pressure that is left to constrain the fiber preform on the forming surface. This pressure differential will vary depending upon a number of factors including the profile of the pressure gradient, hence the permeability of the materials being infused, and the timing sequence of clamping the inlet and exit lines. The finished thickness of a given preform is directly related to its finished fiber volume fraction. Achieving a high fiber volume fraction requires compaction of the preform. Compaction is achieved by pressing the preform against the forming surface. Proper constraint of the preform against the forming surface during and after infusion until the resin cures is critical to obtaining a high performance structure that results from its having a high fiber volume. If the net compaction pressure is insufficient (in traditional VaRTM, it can approach zero), the preform is free to float in the resin or to spring back from its compacted state, leading to reduced fiber volume fractions.

Seemann Composites, Inc. has produced a variety of composite structures for Boeing using the Seemann Composite Resin Infusion Molding Process (SCRIMP) from flat panels for making mechanical tests coupons (Boeing-Seattle, Fall 1999) to complex, demonstration wing structure (Boeing-LB 1998-2000) with the intention to use SCRIMP for making aerospace parts. A common problem experienced with these structures and panels has been lower than desired fiber volumes and concomitantly higher than desired finished thickness per ply for aerospace use. The preferred range for the carbon fiber volume fraction in aerospace composites is nominally at the higher end of that attainable, nominally 52-60% depending upon the preform being infused. The desired fiber volume is highly dependent upon the type of weave or other fiber architecture and the size and count of carbon tow for example. The laminates and structures Seemann Composites made for Boeing typically had a fiber volume fraction lower than the desired range. Control of the composite thickness through the inches per ply metric is important in order to control the resulting weight of the composite. In traditional resin infusion failure to optimize the thickness often means that each ply is thicker than necessary. Resin lacking fiber reinforcement has poor strength, so uncontrolled plies in a laminate can form a pattern of high strength areas sandwiched between lower strength areas. The overall laminate will have lower strength than a properly consolidated laminate having the optimal per ply thickness, and will generally require more plies to achieve the desired strength. More plies translates to more material and more labor, making already expensive parts even more expensive. It also translates to more weight, reducing overall performance of the aerospace system in which the composites are used.

As described in U.S. Pat. No. 4,902,215, Seemann induced preferential flow and pressure in the flow media above the fiber preform inside the vacuum bag to distribute the infusing resin in a network over the preform. The driving force is a pressure differential or head pressure created primarily by drawing down the pressure inside the bag using a vacuum pump. Atmospheric pressure on the resin pushes resin into the bag through an inlet tube. Resin entering the bag encounters the flow media used to channel the resin to the underlying fiber preform. Resin flows laterally through the flow media over the preform and, subsequently, downwardly into the preform. The preform normally has the lowest permeability to flow (i.e., the highest resistance to the flow of resin).

Some have proposed to obtain higher fiber volumes by adopting a process that could be simply described as fill or feed and bleed. Here the preform is infused using full atmospheric pressure to push the resin into the dry preform as is done with traditional resin infusion—the fill step. After the preform is fully infused the inlet line(s) are clamped and then the preform is exposed to full or nearly full vacuum at the exit(s) or at both the exit(s) and inlet(s)—the bleed step. The bleeding of the preform will result in higher fiber volumes. However, the fill and bleed process lacks control and is a timed process lest too much resin may be removed from the preform, either locally or throughout the preform. Moreover, the different permeabilities with the assemblage of different preform components, media, etc. complicates any ability to control the bleed and the resultant fiber volume. By Darcy's Law resin will flow from the infused preform more rapidly from areas of higher permeability. Practical structure commonly found in aerospace design would likely contain such differences in permeability in a given preform assemblage.

The resin infusion process of the present invention ensures that the fiber plies in the preform will remain compacted, that the preform is completely filled when the infusion is halted, and that optimum fiber volume fractions are achieved, thereby improving the traditional infusion processes.

SUMMARY OF THE INVENTION

In the present invention, we control the net compaction pressure and the differential pressure driving the resin infusion by reducing the pressure below atmospheric in the resin feed tank. We use a vacuum pump to compact the fiber preform in several cycles and then evacuate the volume under the vacuum bag to set a final internal bag pressure at a level appropriate for the resin chemistry and cure cycle. The pressure on the feed resin in the feed pot is controlled independently of the pressure in the vacuum bag. For example: pressure in the vacuum bag might be ~30 inches Hg below atmospheric while pressure in the feed pot is 15 inches Hg, for a differential pressure to drive resin infusion of 15 inches Hg (roughly ~0.5 atm or 7 psi). The net compaction pressure in this case also will be about 15 inches of Hg (roughly ~0.5 atm or 7 psi).

The below atmospheric pressure on the feed pot ensures: (1) that there will always be a net compaction pressure to hold the preform in position on the forming surface; and (2) that adjustments can be made in the net compaction pressure in order to compensate for some thickness variances in the preform and for variances in the ambient pressure due to weather conditions or differences from nominal, sea-level pressure conditions.

DETAILED DESCRIPTION OF A PREFERRED EMBODIMENT

Resin infusion processes that do not control internal pressure have had limited success in attaining desired fiber volumes in finished composite structures, components, and details. Our controlled atmospheric pressure resin infusion (CAPRI) process controls the fiber volume adequately to achieve the highest volume fractions possible, we believe, for a given preform architecture. CAPRI can achieve equivalent or higher fiber volumes than those achieved for composites made from prepregs and cured by autoclave. CAPRI does not require pressure vessels as processing equipment that are expensive and, often, rate limiting. Therefore, CAPRI is a preferred method for making aerospace-grade composites where controlling the fiber volume fraction (or "per ply" thickness) is important to obtain composites having the optimum specific strength (i.e., load carrying capability/unit weight or strength/mass).

CAPRI recognizes that the level of pressure on the inlet resin profoundly influences the fiber volume of the finished composite. Controlling this inlet pressure in conjunction with cyclic compaction of the dry preform prior to infusion allows production of laminates of higher fiber volume than the prior art methods we have discussed.

Figure 2:
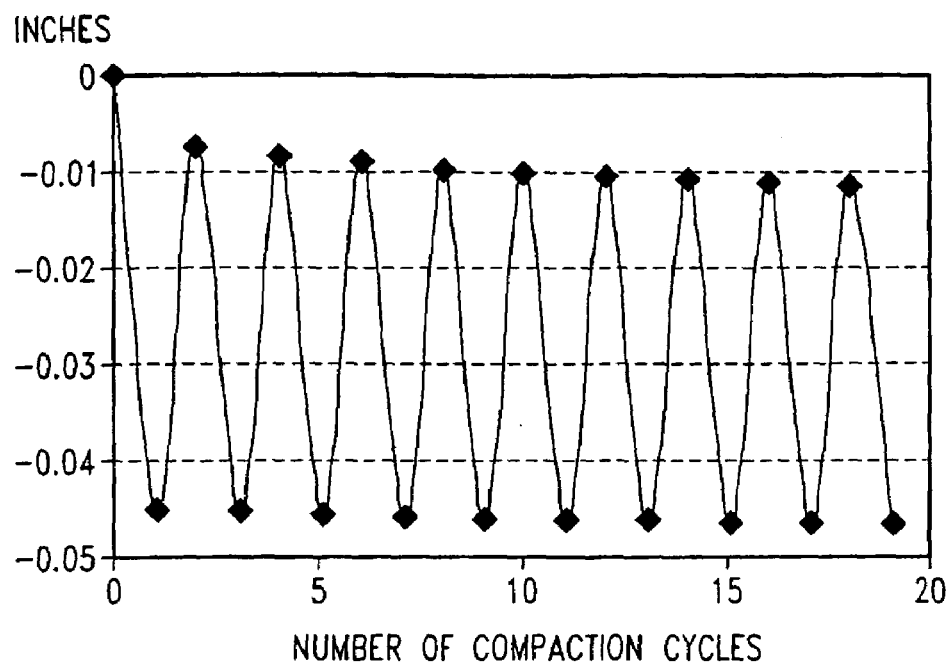
FIG. 2 is a graphic showing the thickness change as a function of compaction cycles for 1581 glass fiber reinforcement in a typical infusion preform.
Figure 3:
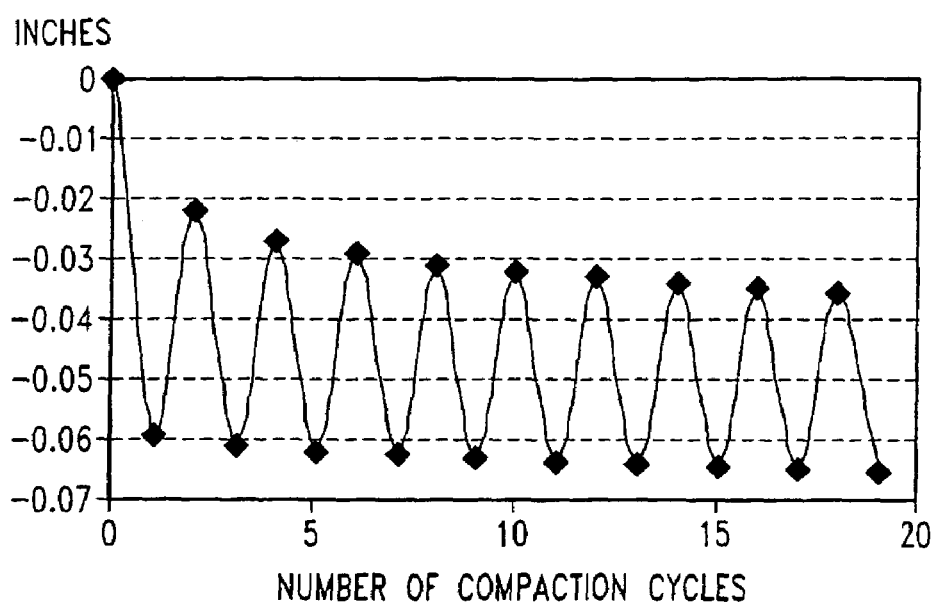
FIG. 3 is a graph showing the thickness change as a function of compaction cycles for 3K-70-P carbon fiber reinforcement in a typical infusion preform.
Figure 4:
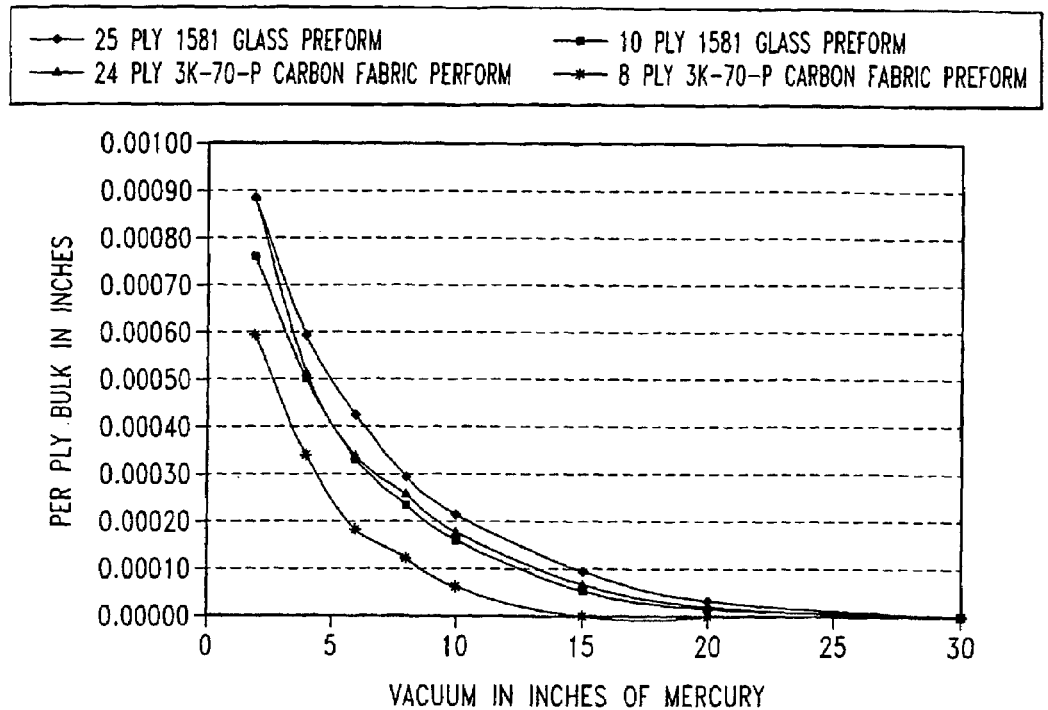
FIG. 4 is a graph showing "per ply" both as a function of compaction overpressure (inches of Hg vacuum in the vacuum bag) for four fiber preforms.
Figure 5:
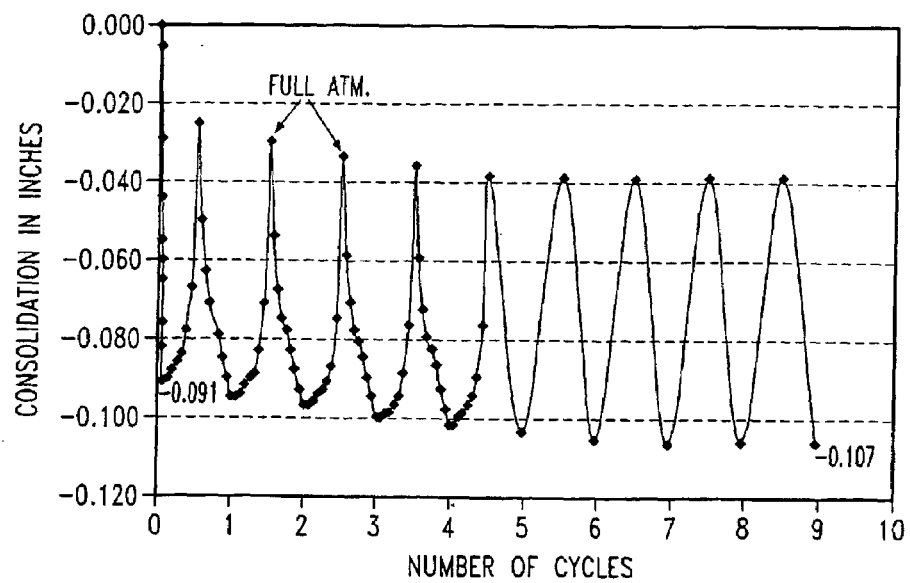
FIG. 5 is a graph showing the thickness change as a function of compaction cycles for a Saertex Stitched Panel preform.
Figure 6:
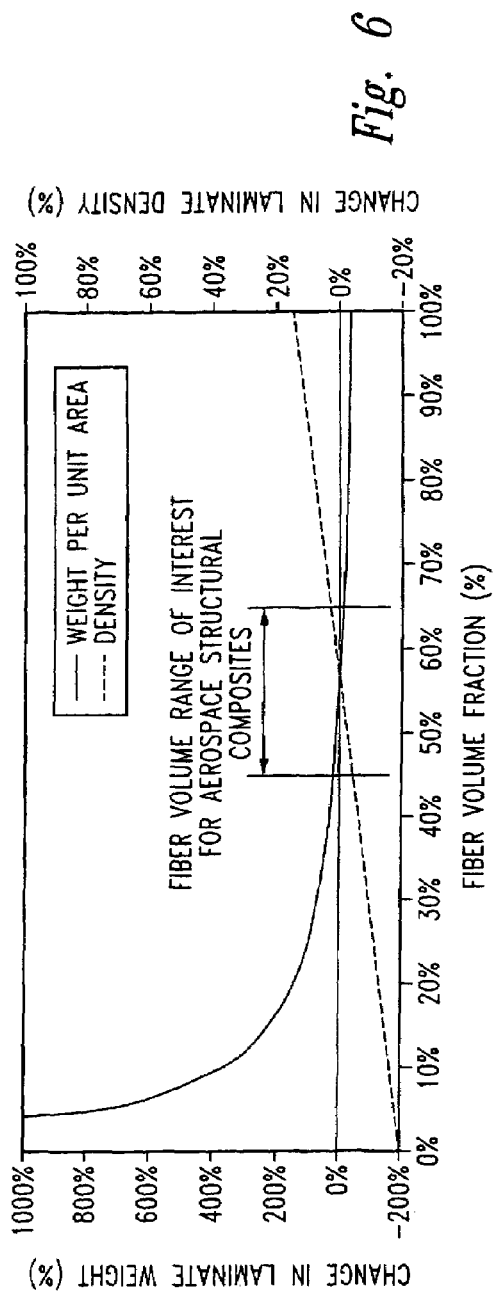
FIG. 6 is a graph showing the change in laminate weight and the change in laminate density as functions of fiber volume fraction, showing the range of performance allowed for aerospace and other high performance composites.
Figure 7:
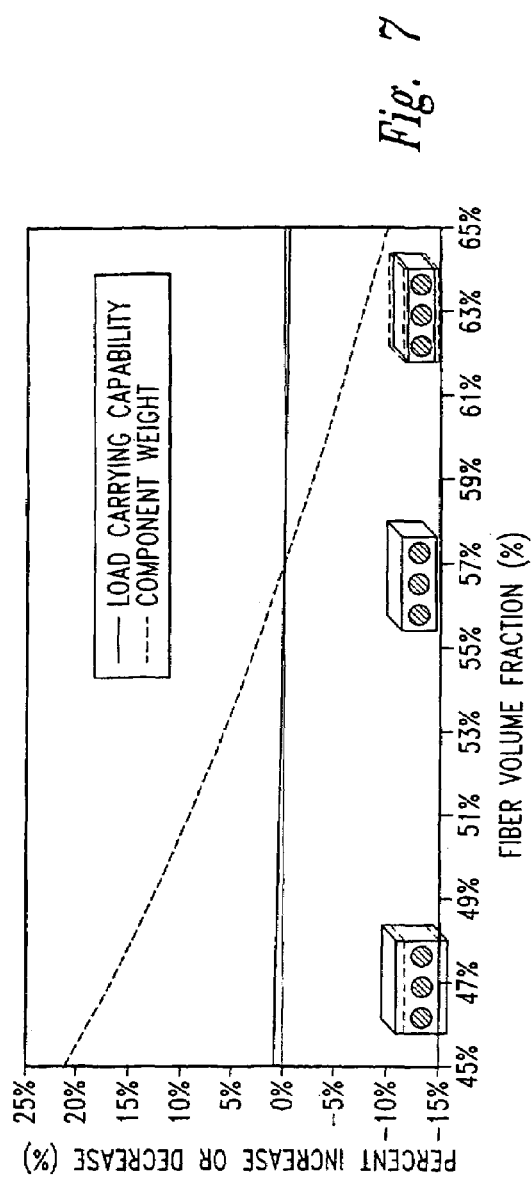
FIG. 7 is a graph showing load carrying capability and component weight as functions of fiber volume fraction for a preform having a set number of fibers.

CAPRI combines control of the inlet pressure by making it below ambient atmospheric pressure while maintaining a net compaction pressure on the preform during the entire infusion. This reduction of the inlet pressure during infusion creates and maintains a predetermined, controlled net compaction pressure on the preform throughout the infusion process and as the pressure equilibrates within the preform following infusion. The net compaction pressure is no longer dependent on the ambient atmospheric pressure. The CAPRI process can produce the optimum, aerospace fiber volume possible for a given fiber architecture by achieving and retaining the optimum compaction of the preform. Additionally, lower, yet targeted, fiber volumes can be easily produced if so desired by controlling the compaction pressure, as shown in FIG. 4. FIGS. 2, 3, and 5 show the increase in fiber nesting from compaction cycling of the preform prior to infusion. Similar findings were reported in "The Compression Response of Fibre Beds Subjected to Repeated Loading Cycles in the Resin Infusion Under Flexible Tooling (RIFT) Manufacturing Process", J A Craen, S M Grove and J Summerscales, University of Plymouth, UK.) Our tests confirm that cyclic compaction provides additional compaction over a single debulking. We assume that, in some preforms, the fibers in one ply catch fibers in the adjacent plies reducing their 'spring back' between compaction cycles, while in other preforms the compaction results primarily from nesting only. We have found that the number of cycles to obtain a practical optimum of compaction is dependent upon the architecture of the preform. For preform architectures normally used in aerospace applications, we have found the number of cycles necessary to be between 5 and 10.

During our compaction cycling tests (see FIGS. 2, 3, & 5), we also noted that, depending upon the fiber architecture, the preform had a varying response to loss of pressure constraining rise of the preform. That is, the preform essentially has a 'spring constant' with which it resists compaction. Generally, a preform compacted under a high vacuum will rise little until a significant amount of the atmospheric pressure is applied inside the bag. For example, FIG. 4 shows that this break for 3K-70-P carbon fibers occurs around 0.5 atm. This phenomenon means that infusing the resin with a net compaction pressure of more than about 0.5 atm will allow the infusion to achieve the desired finished thickness per ply and fiber volume of the finished composite. Also, the key to controlling the fiber volume is understanding how a given preform behaves in response to change in the pressure compacting it and its response to cyclic compaction. As the curve in FIG. 4 demonstrates, if the net compaction pressure is less than about 0.5 atm, the preform for 3K-70-P carbon fibers will begin to expand rapidly as the net compaction pressure on the preform is reduced by the incoming resin pressure. The infused composite will have a lower fiber volume fraction than desired. Understanding the interrelation between the pressure on the inlet resin, cyclic compaction, the response of a compacted preform to changes in pressure before and during infusion allows users of CAPRI to achieve high finished fiber volume with improved tool-side surface definition in the composite structure.

Areas of low permeability commonly occur in complex preforms. CAPRI processing can intentionally include additional areas of low permeability to provide control over the flow front without sacrificing high fiber volumes. Control of the resin pressure prevents the buildup of pressure caused by areas of low permeability along the flow front. Without the control on the pressure on the incoming resin provided by CAPRI, areas of low permeability can increase the pressure within the preform, thereby reducing the net compaction pressure and resultant fiber volume. Additionally, the CAPRI method of flow control eliminates the need to "purge" or "flush" resins thus eliminating resin waste.

Alternative bagging schemes for the CAPRI process address reliability and performance concerns associated with other processes. Two key bagging features are: (1) an active vacuum seal to prevent infiltration of atmospheric air into the bag, and (2) when using multiple bags, balancing the level of pressure in the active vacuum seal/outer bag with the level of laminate pressure to prevent the infusion of air or bleeding of resin. The more common approach used in industry to provide protection against a leak in the impervious sheet (first bag) or in the surrounding seal is to double-bag the entire part and completely evacuate the volume between the inner and outer bags. This approach fails to recognize that fully evacuating this volume will create a pressure difference between the wetted preform and the evacuated area between the first and second bag should a leak develop in the first bag. This difference in pressure will likely cause resin to flow out of the preform. Matching the pressure (i.e., level of vacuum) between the bags to that of preform limits or prevents loss of resin in the preform should a leak develop in the first bag, because there is no driving force to force the resin from the laminate into the space between the two bags.

We prefer to maintain as high a net compaction pressure on the preform, measured at the inlet to the bag, as possible to keep the preform compacted. The net compaction pressure, however, generally will be about 0.5 atm to allow an adequate driving force to complete the infusion yet maintain the desired fiber volume for aerospace. Care must be taken to ensure that the bag is sealed. During infusion, we prefer that the resin not undergo any phase transformation prior to the resin hardening/curing step that follows infusion.

FIGS. 6-9 show the importance of fiber volume ("per ply" thickness) to achieving high performance, low weight composites. While the fibers in the preform will still carry their expected load in an "uncontrolled" composite, a decrease in the fiber volume fraction produces a heavier structure than necessary where the added weight does not provide any performance benefit.

Figures 8, 9:
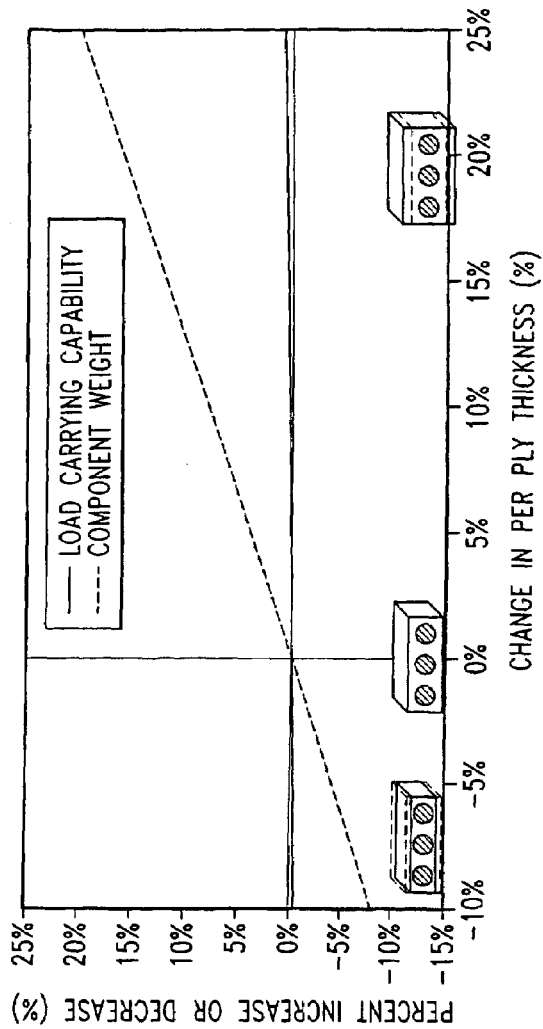
FIG. 8 is a graph showing load carrying capability and component weight as functions of the change in "per ply" thickness.
FIG. 9 is a table showing the correlation between "per ply" thickness and fiber volume fraction for carbon fiber preforms under various pre-treatment conditions.

Using CAPRI we have achieved panel thicknesses equivalent to autoclave-processed panels made from prepregs (FIG. 9). The CAPRI process provides thickness control that matches or exceeds the variance in thickness for autoclaved cured parts. Achieving these thicknesses and controlling them is important for some aerospace application where controlling the weight and the specific strength of a part is critical. CAPRI allows the manufacture of aerospace parts without the need of an autoclave, thereby greatly reducing capital and tooling costs.

CAPRI also utilizes lower cost materials than prepregs, reduces cycle time, and enables the making of larger, more complex integrated structures having superior tool-side surface finish. In addition to making the highest quality composites with relatively low overall tooling costs, a manufacturer can expect a 20-50% reduction in raw material costs and a 10-40% labor cost reduction depending upon level of design integration, design approach, and the adoption of lean, no batching, flow that resin infusion allows.

Figure 1:
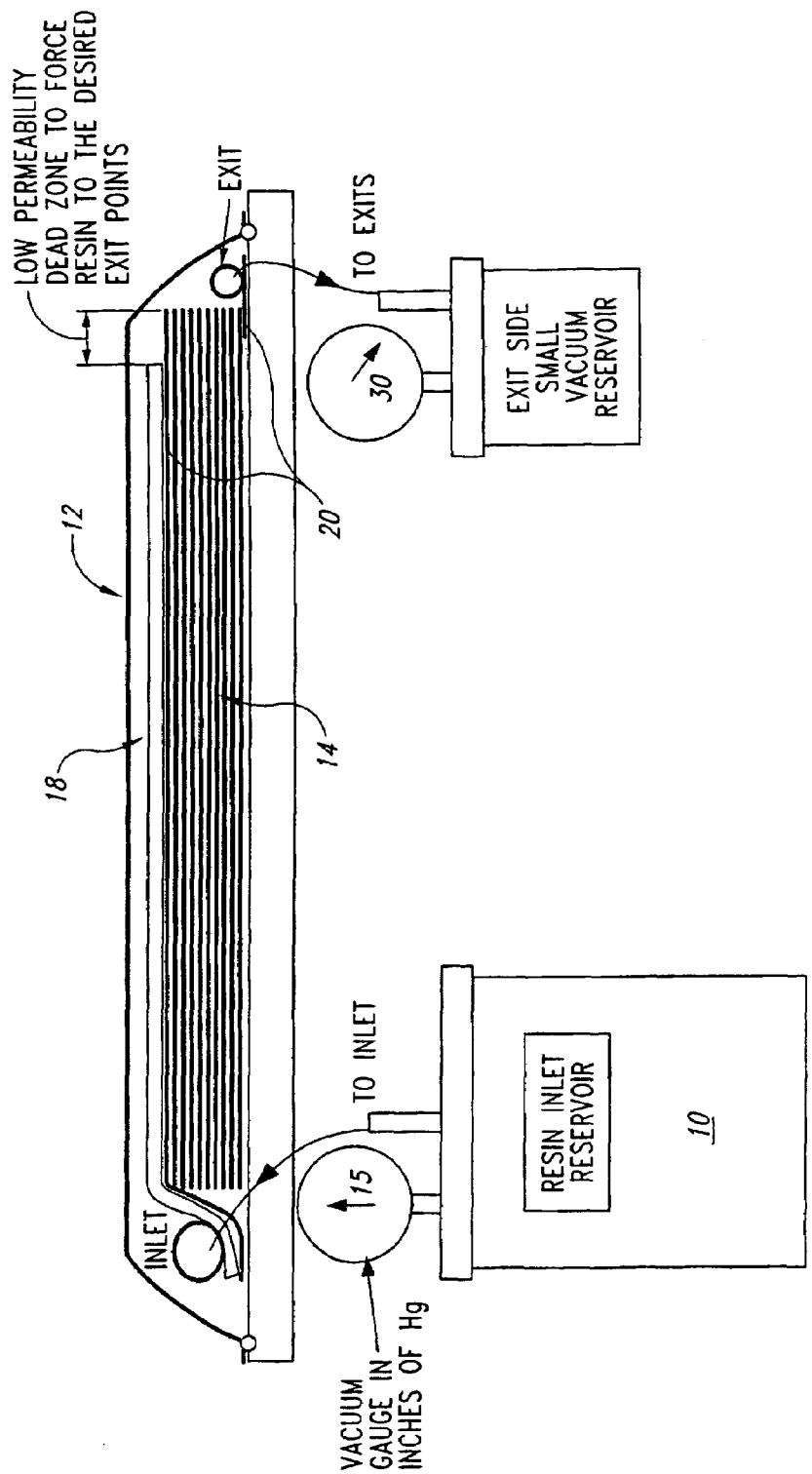
FIG. 1 is a schematic representation of the preferred process of the present invention.

As shown in FIG. 1, the preferred CAPRI process places a reduced pressure (vacuum) on the inlet reservoir 10 of about 0.5 atm (7.5 psi or 15 inches Hg). A vacuum pump operating at the exit of the bagging 12 reduces the pressure at the outlet to essentially full vacuum (0 psi or 0 inches Hg) to create a driving force between the inlet reservoir and the outlet. The pressure on the resin in the inlet reservoir pushes the resin into the bag 12 where a preform 14 of dry reinforcing fiber in tape, fabric, or stitched configuration sits on a mold surface 16 with appropriate release plies, as necessary. Resin entering the bag 12 flows into a distribution media or any like channels grooves, or other device or architecture 18 that carries or channels the resin over the preform 14 and over a porous peel ply 20. The resin flows through the peel ply 20 down into the preform, moving from the inlet toward the outlet. During infusion, pressure in the bag will increase from essentially full vacuum to about the pressure of the inlet reservoir. As such, the net compaction pressure pressing on the preform 14 will be about 0.5 atm.

The distribution media 18 stops short of the outlet to create a "dead zone." Resin cannot reach that outlet without passing through the final portion of the preform that underlies the "dead zone" beyond the end of the distribution media. The "dead zone," therefore, assures that the preform will be fully wet when resin reaches the exit line or tab. Typically this portion of the preform will be about 0.125 to 0.5 inches long.

We use the existing VaRTM resins in our process, but prefer to use low viscosity resins (50-800 centipoise) without heat on the inlet reservoir or tooling. The preform or the preform and resin can be heated if desired to speed infusion or to allow the use of resins that have such high room temperature viscosities that infusion at room temperature is impractical. We prefer a distribution media or method of resin distribution that has high permeability, thereby providing minimal resistance to flow of the resin across the surface of the preform. We have been able to produce test parts having high fiber volume fractions corresponding in quality and performance properties to the requirements Boeing imposes on autoclaved composites made in accordance with Boeing Specification BMS8-256. Our test parts have had slightly lower performance in in-plane shear, however, than their autoclaved counterparts. We attribute this to the brittleness of available infusion resins rather than to a result from CAPRI processing. We expect that future resin formulations will eliminate this relatively small gap.

While we have described preferred embodiments, those skilled in the art will recognize modifications or variations which might be made without departing from the inventive concept. The examples provided in sections II and III illustrate the invention and are not intended to limit it. Therefore, the description and claims should be interpreted liberally with only such limitation as is necessary in view of the pertinent prior art.

We claim:

1. In a resin infusion process wherein resin flows into a preform within at least one vacuum bag to form a composite part having a high fiber volume fraction, the improvement comprising:

providing a resin inlet reservoir;

reducing the pressure in the resin inlet reservoir to below atmospheric pressure; and while maintaining the pressure in the resin inlet reservoir below atmospheric pressure, flowing resin from the resin inlet reservoir into the preform to maintain a net compaction pressure on the preform adequate to retain compaction at a predetermined level, thereby allowing manufacture of a quality composite part.

2. The process of claim 1 wherein the resin flows out of the preform into a resin outlet reservoir, and wherein the net compaction pressure is at least partially controlled by reducing the pressure in the resin outlet reservoir so that the pressure in the resin outlet reservoir is less than the pressure in the resin inlet reservoir.

3. The process of claim 1 wherein reducing the pressure in the resin inlet reservoir includes reducing the pressure in the resin inlet reservoir to a first pressure that is less than atmospheric pressure, wherein the resin flows out of the preform into a resin outlet reservoir, and wherein the method further comprises reducing the pressure in the resin outlet reservoir to a second pressure that is less than the first pressure.

4. The process of claim 1 wherein the net compaction pressure is about 0.5 atm.

5. The process of claim 1 wherein the pressure on the resin inlet reservoir is about 5-8 psi below atmospheric pressure.

6. The process of claim 1 wherein reducing the pressure in the resin inlet reservoir includes reducing the pressure in the resin inlet reservoir to about 6-9 psi, wherein the resin flows out of the preform into a resin outlet reservoir, and wherein the method further comprises reducing the pressure in the resin outlet reservoir to about 0-1 psi.

7. A method for making a composite part from a compacted preform, the method comprising:

cyclically compacting a dry preform to provide improved control of fiber volume fraction;

reducing the pressure in a resin inlet reservoir to below atmospheric pressure; and after the cyclic compaction of the dry preform and while maintaining the pressure in the resin inlet reservoir below atmospheric pressure, flowing resin from the resin inlet reservoir into the dry preform to infuse the preform with resin, whereby the benefit of cyclic compaction is enhanced by controlling the resin pressure.

8. The method of claim 7 wherein the dry preform is cyclically compacted prior to flowing the resin from the resin inlet reservoir into the preform, and wherein the method further comprises maintaining a net compaction pressure of about 0.5 atm on the preform during resin infusion.

9. A process for making a composite part having a high fiber volume fraction, a predetermined thickness, and a controlled thickness using resin infusion comprising flowing a resin into a preform on a forming surface, the process comprising the steps of:
 (a) cyclically compacting the preform to a desired thickness,
 (b) placing a resin feed pot containing the resin under a partial vacuum;
 (c) while maintaining the pressure in the resin feed pot at a partial vacuum, flowing resin from the resin feed pot into the preform; and
 (d) retaining the desired thickness of the preform while infusing the resin by retaining a suitable net compaction pressure on the perform.

10. The process of claim 9 wherein the net compaction pressure is achieved by placing a resin drain pot that receives the resin from the preform under a partial vacuum.

11. The process of claim 9 wherein the preform is cyclically compacted prior to flowing the resin from the resin feed pot into the preform.

12. The process of claim 9 wherein placing the resin feed pot under a partial vacuum includes placing the resin feed pot at a first pressure that is less than atmospheric, and wherein the net compaction pressure is achieved by placing a resin drain pot that receives the resin from the preform at a second pressure that is less than the first pressure.

* * * * *

UNITED STATES PATENT AND TRADEMARK OFFICE
CERTIFICATE OF CORRECTION

| | | |
|---|---|---|
| PATENT NO. | : 7,334,782 B2 | Page 1 of 1 |
| APPLICATION NO. | : 10/485725 | |
| DATED | : February 26, 2008 | |
| INVENTOR(S) | : Woods et al. | |

It is certified that error appears in the above-identified patent and that said Letters Patent is hereby corrected as shown below:

On Sheet 3 of 5, in Fig. 4, line 2, delete "PERFORM" and insert -- PREFORM --, therefor.

In column 5, line 52, delete "primarly" and insert -- primarily --, therefor.

In column 9, line 15, in Claim 9, delete "perform" and insert -- preform --, therefor.

Signed and Sealed this

Nineteenth Day of August, 2008

JON W. DUDAS
*Director of the United States Patent and Trademark Office*